(12) United States Patent
Thenthiruperai et al.

(10) Patent No.: US 7,369,988 B1
(45) Date of Patent: May 6, 2008

(54) METHOD AND SYSTEM FOR VOICE-ENABLED TEXT ENTRY

(75) Inventors: Balaji S. Thenthiruperai, Overland Park, KS (US); Clyde C. Heppner, Liberty, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 817 days.

(21) Appl. No.: 10/373,822

(22) Filed: Feb. 24, 2003

(51) Int. Cl.
*G06L 17/21* (2006.01)
(52) U.S. Cl. ...................................... 704/10
(58) Field of Classification Search .............. 704/10
See application file for complete search history.

(56) References Cited

U.S. PATENT DOCUMENTS

| | | | |
|---|---|---|---|
| 5,778,157 A * | 7/1998 | Oatman et al. ............... | 706/46 |
| 5,978,820 A * | 11/1999 | Mase et al. .................. | 715/531 |
| 6,061,718 A * | 5/2000 | Nelson ........................ | 709/206 |
| 6,606,486 B1 * | 8/2003 | Cubbage et al. ......... | 455/186.2 |
| 6,633,846 B1 * | 10/2003 | Bennett et al. ............. | 704/257 |
| 6,795,822 B1 * | 9/2004 | Matsumoto et al. .......... | 707/10 |
| 2001/0032074 A1 * | 10/2001 | Harris et al. ................ | 704/231 |
| 2002/0028697 A1 * | 3/2002 | Davies ........................ | 455/566 |
| 2002/0077811 A1 * | 6/2002 | Koenig et al. .............. | 704/201 |
| 2002/0091511 A1 * | 7/2002 | Hellwig et al. ............. | 704/201 |
| 2002/0184197 A1 * | 12/2002 | He et al. ........................ | 707/3 |
| 2002/0194388 A1 * | 12/2002 | Boloker et al. ............. | 709/310 |
| 2003/0105623 A1 * | 6/2003 | Cyr et al. ..................... | 704/201 |
| 2003/0125947 A1 * | 7/2003 | Yudkowsky ................. | 704/247 |
| 2003/0171929 A1 * | 9/2003 | Falcon et al. ............... | 704/275 |
| 2003/0187658 A1 * | 10/2003 | Selin et al. ............... | 704/270.1 |
| 2003/0204394 A1 * | 10/2003 | Garudadri et al. .......... | 704/201 |
| 2004/0128135 A1 * | 7/2004 | Anastasakos et al. .... | 704/270.1 |
| 2004/0192355 A1 * | 9/2004 | Nowlan ....................... | 455/466 |
| 2006/0142997 A1 * | 6/2006 | Jakobsen et al. ............. | 704/10 |

OTHER PUBLICATIONS

Conversay Speech Technology Solutions White Paper, "*Distributed Voice Processing: A more versatile approach to speech-enabling wireless devices*", © Copyright 2001, Conversay Inc., Version 1.0, 10 pages.

Carlos Gershenson, "*Artificial Neural Networks for Beginners*", School of Cognitive and Computer Sciences, 9 pages, (Autumn, 2001).

Neural Netwroks, What is an Artificial Neural Network?, *Artificial Neural Networks*, © Copyright 1997 Battelle Memorial Institute, 1 page.

W3C® Candidate Recommendation, "*Speech Recognition Grammar Specification Version 1.0*", 104 pages, (Jun. 26, 2002).

ETSI, "Distributed Speech Recognition—Aurora", 2 pages, date unknown.

* cited by examiner

*Primary Examiner*—David Hudspeth
*Assistant Examiner*—Justin W. Rider

(57) ABSTRACT

A method and system for voice enabled text entry. The method includes receiving a first user-entry with a communications device and creating a transient grammar set as a result of receiving the first user-entry, where the transient grammar set is based on the first user-entry. The method further includes providing an indication that the transient grammar set is created, the indication being provided using the communications device. The method still further includes receiving a second user-entry with the communications device and responsively selecting a text string from the transient grammar set, where the text string corresponds with the second user-entry.

42 Claims, 2 Drawing Sheets

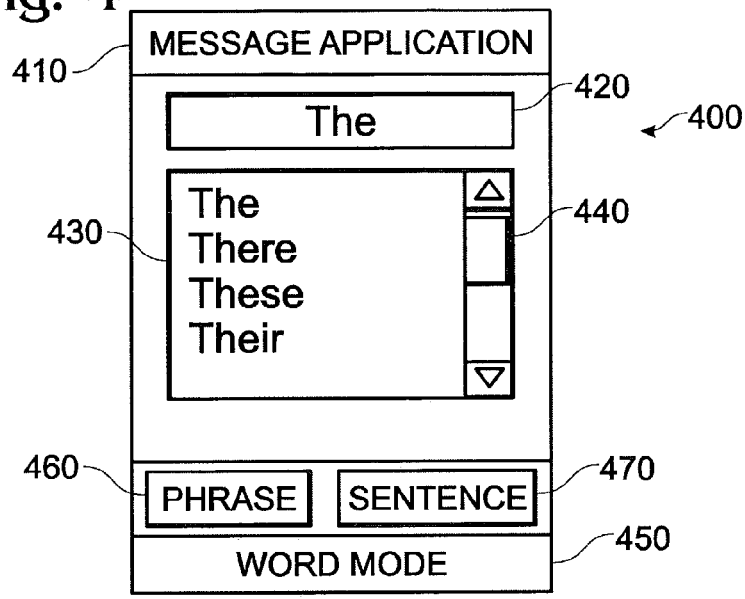
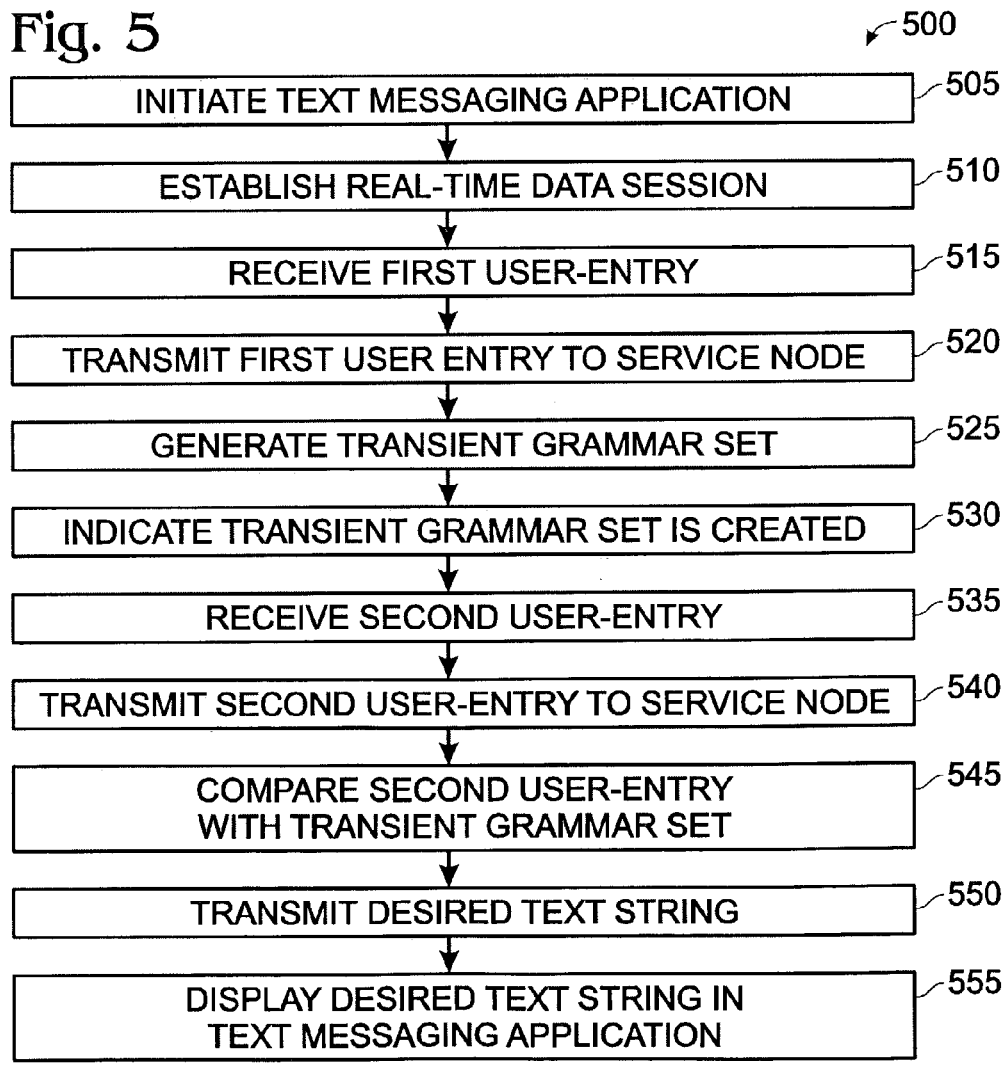

METHOD AND SYSTEM FOR VOICE-ENABLED TEXT ENTRY

BACKGROUND

I. Field of the Invention

The present invention is directed to telecommunications. More particularly, the present invention is directed to method and apparatus for communicating using text messages.

II. Description of Related Art

In a typical text messaging system, such as may be used on the Internet, a user types a text message to be sent to a recipient in its entirety, such as with a personal computer. The message is then transmitted, when completed, to the intended recipient. Such text messaging systems may include instant messaging applications, short-message-system applications, short-mail applications, or email applications. In such applications, the process of entering text messages in their entirety is typically time consuming and prone to error due to typographical mistakes and the like. Such drawbacks are further magnified when the user is employing one of a number of communications devices that have a reduced number of keys for sending text messages. Such communications devices include, for example, wireless phones that are capable of connecting to the Internet and/or the World Wide Web.

Because such communications devices typically have twelve keys (traditional telephone keys) that are used for information entry, multiple letters of the alphabet, in their alphabetic order, are usually assigned to a subset of those keys. Typically the digits two to nine have three or four letters associated with them. Symbols and other special characters may be accessed via a menu that is available on the communications device, or a selection key (such as '*' or '#') may be available to change the key assignments to represent symbols and/or shift between upper and lower case letters. Thus, this limited key set on such communication devices does not easily lend itself to typing text messages in their entirety.

In this regard, methods such as "triple-tapping" are typically used to enter text. "Triple-tapping", which is known, is an approach for text entry where a user taps a key once to enter a first letter (or symbol) associated with that key, a second time to enter a second letter or symbol associated with that key and a third time to enter a third letter or symbol associated with that key. In fact, since such devices typically have certain keys that have four letters (as was noted above) or symbols associated with them, a fourth tap would be needed to enter a fourth character associated with a key. Also, there is usually a time-out period in which successive taps must occur, otherwise the communication device assumes the letter corresponding with the last tap is the desired letter and enters that letter. If the user waits longer than this period to hit a successive key tap, deletion may be needed to correct the entry of an unwanted character. Therefore, such a method for text entry may be time consuming, inefficient and prone to error due the successive key taps needed to enter a single character.

Alternative methods of text entry have been implemented in an attempt to overcome the shortcomings of the triple-tapping technique. However, these solutions also have drawbacks. For example, an alternative text entry method for communication devices having limited key sets is the so-called T9 text entry technique. In the T9 technique, a user hits the keys associated with the desired characters or symbols only once, regardless of the alphabetic position (or order) of the desired character relative to the group of characters associated with a particular key. These key taps are then compared with a list of text strings and one or more "matches" may be presented to the user. The "matches" are based on the various combinations of letters that match text strings included in a list contained in the communications device, such as a mobile phone.

One drawback with T9 text entry is that if the desired text string does not exist in the text list, a user typically has to delete the entire entry, switch to a different text entry mode (such as to triple-tapping entry), and reenter the desired text string. Another drawback of the T9 approach is that it is not easily compatible with the entry of acronyms. Since most acronyms are not correctly spelled words, they are typically not recognized by such a technique. As with the triple-tapping technique, overcoming these aspects of such a text entry technique may be time consuming for the user and prone to error, such as including an incorrect "match" in a text message.

Another approach that has been used for communication devices that have limited keys, or text entry capabilities, is the use of collapsible keyboards that attach to such communications devices. While allowing a complete keyboard to be used, such an approach requires the user to transport another piece of equipment in order to have a more efficient text entry technique available to them. Because users of such mobile communications device typically want to reduce the amount of equipment they need to carry, such an approach is counter to that goal. Additionally, such an approach still has the drawbacks of a user typing entire text messages that were noted above (e.g. being time consuming and prone to error).

SUMMARY

According to an exemplary embodiment, a method of text entry in accordance with the invention includes receiving a first user-entry with a communications device. Various methods for creating such a user-entry exist. For example, a user may type such an entry, or a user may speak to create such an entry. Of course other techniques for creating the first user-entry exist. Likewise, various communications devices may be used to implement such a method. For example, a mobile telephone may be used.

The method further includes creating a transient grammar set based on the first user-entry. As is known, a grammar set may correspond with a set of "phonemes" (small units of speech that distinguish one verbal utterance from another) that represent particular words (and, alternatively, corresponding text strings). Such grammars may also account for variations in pronunciation.

For example, a user may enter the character 'o', then 'f' and then 't'. The transient grammar set created based on this entry "oft" may correspond with a collection of phonemes that represent various pronunciations of the word "often." In this regard, one person may pronounce the word "often" as "off" "en" while another person may pronounce that same word "off"-"ten." The transient grammar set typically accounts for both cases by identifying different sets of phonemes that respectively correspond with both pronunciations.

The transient grammar set may be created from a grammar store, which may be centralized or distributed collection of grammars. Such a transient grammar set typically includes a subset of the grammars contained in the grammar store, the subset of grammars being generated in correspondence with a user-entry. The transient grammar set may also correspond with a set of text strings (also transient) that are predictive of a desired text string based on the user-entry. The transient grammar set and any corresponding text strings are typically discarded after the desired text string is identified.

The method then includes providing an indication that the transient grammar set is created, the indication being provided using the communications device. Such an indication may be provided in various manners. For example, an audible indication may be played on the communications device. Alternatively, the list of text strings corresponding with the transient grammar set may be displayed using the communications device. It will be appreciated that the transient grammar set may, or may not have a corresponding set of predictive text strings, and the invention is not limited to the use of either approach.

A second user-entry is then received with the communications device. This second user-entry indicates a selection of a portion of the transient grammar set. The second user-entry is then matched with that portion of the transient grammar set and a text string corresponding with that portion of the transient grammar set is presented to the user on the communications device, such as in a text messaging application, for example.

In another exemplary embodiment, a text-messaging system includes a communications device. Various communications devices may be employed with such a text-messaging system. For example, such communications devices may include personal computers, personal data assistants, laptop computers or mobile phones. Typically, such communications devices are capable of connecting with the Internet and/or the World Wide Web to transmit text messages to other communications devices.

The communications device of such a system is typically communicatively coupled with a communications service node. In this particular embodiment, the communications device and/or the service node implement a speech recognition engine, either alone or in combination. In embodiments where the communications device and the service node implement portions of the speech recognition engine, such a technique is termed distributed speech recognition.

The text messaging system further includes a processor that may be included in either the communications device and/or in the service node. The processor may be a microprocessor, a micro-controller, an embedded processor, or any device capable of executing machine-readable (software) instructions and may be centralized or distributed.

The text messaging system also includes a predictive engine implemented in software. The predictive engine is executable by the processor and generates a transient grammar set from a grammar store. The transient grammar set is based on a first user-entry made using the communications device. The first user-entry may be typed or input by another method.

Once the transient grammar set is created, an indication that the creation is complete is provided on the communications device. Such an indication may be in the form of an audio prompt. Alternatively, a list of text strings corresponding with the transient grammar set may be displayed on the communications device.

A second user-entry is then received using the communications device. This second user-entry may be a spoken entry or, alternatively, it may be a selection from the list of text strings corresponding with the transient grammar set. If the entry is spoken, the speech recognition engine selects a text string associated with a portion of the transient grammar set corresponding with the second user-entry made using the communications device, the second user-entry being a selection from the transient grammar set.

These, as well as other advantages of various aspects of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 4 is a diagram illustrating an embodiment of a user interface for a text-messaging system in accordance with the invention;

FIG. 5 is a flowchart illustrating a method for creating a text message in accordance with the invention.

DETAILED DESCRIPTION

Figure 1:
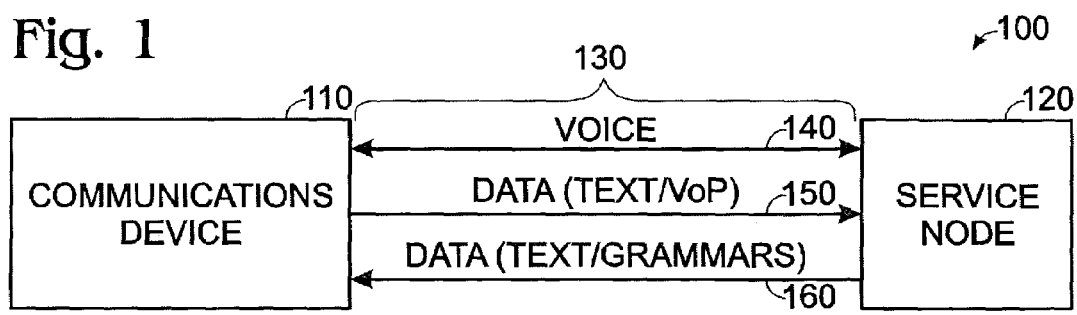
FIG. 1 is a block diagram illustrating a communication system in which embodiments of invention may be employed.

Referring to FIG. 1, a block diagram illustrating a communications system 100 in which exemplary embodiments of the invention may be implemented is shown. Each of the components of the system 100 is described briefly here, and in further detail below. While the system is generally described in the context of a wireless communications environment, it is noted that other application are contemplated by the invention, such as use in wired packet networks, public switch telephone networks, among other applications.

The communications system 100 includes a communications device 110, which may take a variety of forms. The communications device 110 may be a Web-enabled phone (capable of connecting to the Internet and/or the World Wide Web), a Web-enabled personal data assistant (PDA), a desktop personal computer, a laptop computer or an Internet appliance, as some examples.

The system 100 also includes a communications service node 120, which is communicatively coupled with the communications device 110 via a communications link 130. The service node 120 may be a communications server containing applications (e.g. software applications) that are accessible to the communications device 110 (the client). Such an arrangement is termed a client/server arrangement. In the system 100, a text messaging application in accordance with the invention may be executed in a client/server arrangement.

In this regard, information related to executing such applications is communicated between the communications device 110 and the service node 120 using communications link 130. As will be explained in more detail below, such information may include analog voice information communicated from the communications device 110 to the service node 120 on a bi-directional voice channel 140. Text data or digital voice information (e.g. voice over packet (VoP), such as for Internet telephony) is communicated from the communications device 110 to the service node 120 over a data channel 150. Likewise text data and/or grammar data is communicated from the service node 120 to the communications device 110 over the data channel 160.

For the system 100 shown in FIG. 1, the channels 140, 150 and 160 are shown as separate information channels that are a part of the communications link 130. It will be appreciated, however, that this arrangement is exemplary and many alternatives are possible. For example, a single bi-directional data channel may be used, or a single data channel in combination with a voice channel may be used. Also various protocols and techniques may be employed for establishing and communicating information over the communications link 130.

Figure 2:
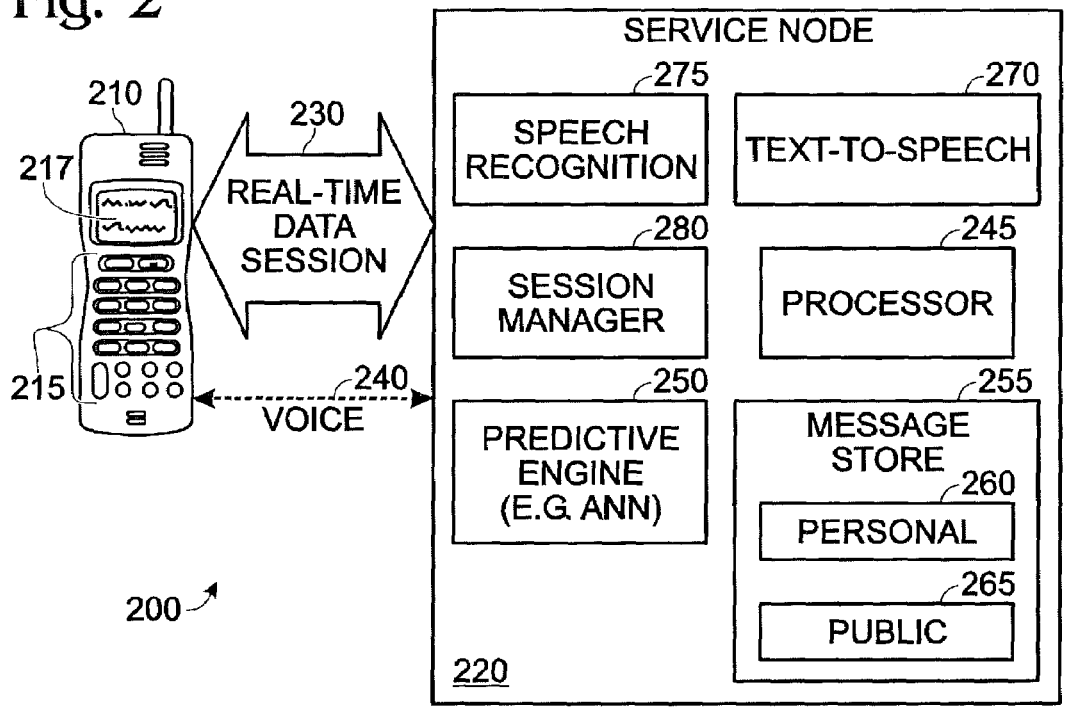
FIG. 2 is a block diagram illustrating an embodiment of a text-messaging system in accordance with the invention.

Referring now to FIG. 2, a diagram illustrating a text-messaging system 200 is shown. The system 200 is similar in certain respects to the system 100 shown in FIG. 1. For ease of comparison, analogous components of the system 200 have reference numbers that correspond with those components of the system 100. In this respect, the system 200 includes a mobile phone 210 that corresponds with the communications device 110 of the system 100. The, mobile phone 210 includes keys 215 and display device 217, which are discussed further hereafter. The system 200 also includes a service node 220 that acts an application server for the mobile phone 210 (the client).

The mobile phone 210 and the service node 220 are communicatively coupled via a real-time data session 230. The real-time data session 230 may be used to communicate voice data (e.g. VoP), text data and grammar data between the mobile phone 210 and the service node 220. Alternatively, voice information may be communicated from the mobile phone 210 to the service node 220 using a voice channel 240 (e.g. analog channel). As has been previously noted, various protocols and session initiation techniques may be employed with regard to the data session 230. For example the data session 230 may be a real-time protocol (RTP) session that is established using the session initiation protocol (SIP) technique. RTP and SIP are known standards and are described in standards documents known to persons working in this art.

For this embodiment, a user enters one or more text characters using the keys 215 of the mobile phone 210 (e.g. using triple-tapping text entry). Those text characters are then transmitted to the service node 220. The service node 220 includes a processor 245 and a predictive engine 250, which is executable by the processor. The service node 220 further includes a grammar store 255 that includes a personal message store 260 and a public message store 265. The personal message store 260 includes grammars that correspond with messages sent by a particular user of the system 200. In this regard, the grammar store 255 is a database that correlates messages of a particular user with that user in the database, such as by using a relational database, as is known.

The public message store 265 contains grammars that are based on (i) formal language rules (e.g. English, German, French, etc.) and (ii) all messages sent using the system 200. The predictive engine 250 creates a transient grammar set based on the text characters that are communicated to the service node 220 by the mobile phone 210. In this regard, the transient grammar set is generated from the user's personal grammars in the personal grammar store 255 and the public grammar store 265.

Furthermore, the transient grammar set includes grammars that correspond to predictions of a text string desired by the user based on the first user-entry, though the transient grammar set does not necessarily contain such text strings.

In this respect, grammars are often implemented as software code and may take the following example form for a LEAVE DATE grammar:

```
LEAVE_DATE [
    ([um ah amm] DATE)
    ([um ah amm] I'd like to leave on DATE)
    ([um ah amm] I'm leaving on DATE)
    ([um ah amm] leaving DATE)
    (um, DATE please)
    ]
```

The phrases in square brackets are so called non-words, and would be ignored by a speech recognition engine when comparing a spoken user-entry with the LEAVE DATE grammar. As may be seen by this example, other sub-grammars may be included with the LEAVE DATE grammar. For this example, DATE is a separate set of grammars (sub-grammar) that recognizes various formats of calendar dates (e.g. tomorrow, a week from Thursday, Feb. 11, 2003, etc.). In this respect, grammars may be nested, or refer to one another. While numerous lines of software code may represent a specific date for the LEAVE DATE grammar, a predictive text string for that specific "leave date" might comprise only a single text version of the predicted date, such as "Feb. 11, 2003."

In generating the transient grammar set, the predictive engine 250 may employ any number of predictive techniques. For example, the predictive engine 250 may include logic that emulates a neural network of a mammalian brain, which may be termed an artificial neural network (ANN). This logic would be executed by processor 245 to create the transient grammar set from the grammar store 255 based on the typed characters received from the mobile phone 210 via the data session 230.

In this respect, an ANN may be implemented in the service node 220 in the following fashion for such an embodiment. The predictive engine 250, as noted above, implements logic that is executable by the processor 245. This logic implements a statistical model that is used predict text strings. The statistical model included in the ANN logic is based on at least four kinds of information: (i) the rules based on formal language grammar rules (e.g. English grammar rules); (ii) all messages that are communicated using the system 200; (iii) all short hands and acronyms used in messages communicated using the system 200 and short hands that are acceptable in the system 200; and (iv) personal messages of a particular user. In such an embodiment, a weighted statistical model that may be used to generate transient grammar sets may be implemented using any number of artificial neural network software applications.

In this regard, the creation of transient grammar sets would depend, at least in part, on weighted probabilities for a respective user based on statistical information corresponding with the four kinds of information listed above. In this regard, the predictive flow for a respective user may be customized to that user by modifying (either statically or dynamically) the statistical weights associated with creating transient grammar sets for the user when using an ANN approach.

Once the transient grammar set is created, the service node 220 may indicate to the mobile phone 210 that the transient grammar set is created. This may be accomplished in a number of ways, and the invention is not limited to any particular technique. For example, the service node 220 may provide a message to the mobile phone 210 that the transient grammar set is created. In response, the mobile phone 210 may play an audio prompt to indicate that the transient grammar set is created. For the system 210, a text-to-speech engine 270 may be used to generate such a prompt. In such a situation, the text-to-speech (TTS) prompt is communicated either using a digital speech format (e.g. VoP) via the data session 230 or as analog speech using the voice channel 240.

Alternatively, the service node 220 may indicate to the mobile phone 210 that the transient grammar set is created by transmitting a list of predictive text strings to the mobile phone 210 using data session 230, where the predictive test strings correspond with the transient grammar set. This list of text strings may be displayed using the display device 217 of the mobile phone 210. Depending on the particular embodiment, the transient grammar set (in place of, or in addition to the text strings) may also be transmitted to the mobile phone 210 using the data session 230.

The user may then make a second entry that corresponds with a portion of the transient grammar set. Such a selection may be made by the user speaking the selection or by depressing one of the keys 215. For the system 200, a spoken selection is sent to the service node 220 via the data session 230 or the optional voice channel 240. A speech recognition engine 275 then processes the spoken selection and the selection is then compared with phonemes corresponding with the transient grammar set. As, is discussed further below, for this embodiment, the mobile phone 210 and the service node 220 may operate in client/server fashion to implement a distributed speech recognition engine, as is known.

Alternatively, the speech recognition engine 275 could be solely client based (located on the mobile phone 210), or solely server based (located on the service node 220). Such approaches may be used for communications systems where digital voice services (e.g. VoP) are not available. In this regard, it may be advantageous to use a client-based approach, as the voice channel 240 would not be employed to carry the spoken selection from the user. Such an approach may reduce the overhead of switching between a data session and a voice channel for such embodiments. However, the mobile phone 210 typically has limited processing capability and, therefore, may not have similar performance with a server based or a client/server based speech recognition engine.

For embodiments where the voice channel 240 is used to carry voice information, the service node 220 includes a session manager 280. The session manager includes logic to manage switching a text messaging session between the data session 230 and the voice channel 240. In this regard, the session manager 280 keeps track of the communications parameters and protocols for both the data session 230 and the voice channel 240 and activates the appropriate connection in response to the type of information being communicated between the mobile phone 210 and the service node 220.

Figure 3:
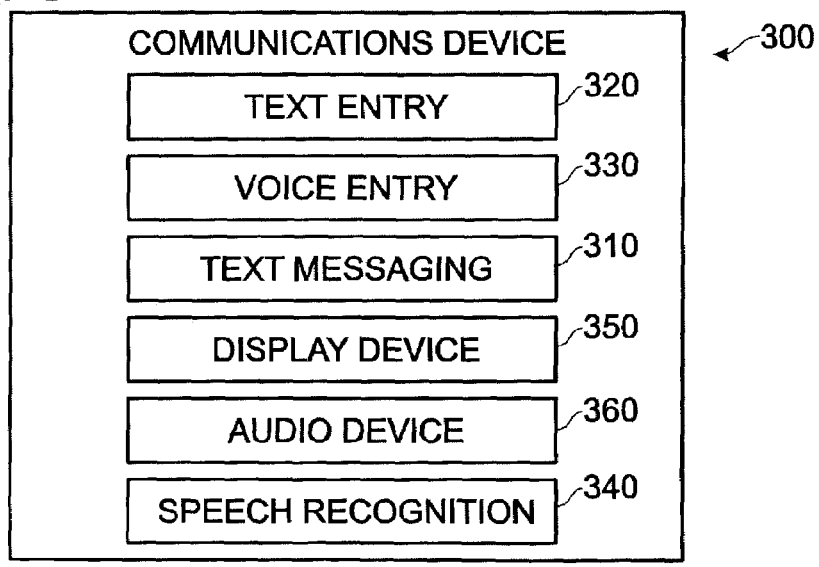
FIG. 3 is a block diagram illustrating a communications device that may be employed in the text-messaging system shown in FIG. 2.

Referring now to FIG. 3, a block diagram showing a communications device 300 that may be used in the systems 100 and 200 is shown. The communications device 300 includes a text messaging application 310, such as was previously discussed. The communications device 300 also includes a text entry device 320. The text entry device 320 may take a variety of forms. For example, the text entry device may be a computer keyboard, a phone key set, a touch screen on a PDA, a speech recognition engine with capabilities limited to recognizing characters and symbols included on a typical computer keyboard, among other possibilities.

The communications device 300 further includes a voice entry device 330, which is typically a condenser microphone, or the like. The voice entry device 330 may provide voice information to the text entry device 320 for embodiments that provide for spoken text entry. The voice entry device may also provide voice information to speech recognition engine 340. As was previously discussed, speech recognition engine 340 may be a client based engine or the client portion of a client/server based engine, both of which are known.

The communications device 300 still further includes an audio device 350 and a display device 360. The audio device 350 may be used to play an audio prompt, such as a TTS prompt, indicating that a transient grammar set has been created. In certain embodiments, the display device 360 may be used to display a list of text strings associated with a transient grammar set, as has been previously described.

FIG. 4 is a diagram showing a user interface 400 for a text-messaging system, and how a list of predicted text strings corresponding with a transient grammar set might be displayed using such an interface. The user interface 400 includes a title bar 410 indicating the text messaging application that is being used on a communications device. The user interface 400 also includes a text entry box 420 where user entered characters are displayed.

A list of predicted text strings is displayed in window 430. If the list of predicted text strings is longer than window 430, a user may scroll through the list with scroll bar 440, as is known. For this particular example, the user has entered "The" and the list of predictive text strings corresponding with the transient grammar set may include "The", "There", "These" and "Their." While other words start with "The", these words may represent a transient grammar that was created based on an entry of "The" for this particular user. Such a result may be due to the message history of the user and the fact that these words are, historically, the predominant words starting with "The" the user has included in text messages. The predictive engine (such as a predictive engine using an ANN) determines the most likely desired text strings for the user. If the user does not want one of these words, the user may simply enter additional characters. If, however, the user does want one of these words, he either speaks that word or selects it by highlighting it and pressing a key to select it. Alternatively, the user may select the desired text string by touching an area of touch screen display where the word is displayed, such as with a stylus.

User interface 400 also includes a status bar 450 indicating a mode for text string prediction. In this example, the status bar indicates that "WORD MODE" is selected. In is this mode, the transient grammar set will include only single words. The button 460 may be used to select "PHRASE MODE." In phrase mode, only multiple word phrases, but less than complete sentences, will be included in the transient grammar set. When the button 460 is pressed (or "clicked"), phrase mode will be activated and so indicated in the status bar 450. The button 460 would also be modified to read "WORD", so as to allow the user to return to word mode, if so desired. Likewise, a user selects sentence mode using a button 470. In this mode, only complete sentences are included in the transient grammar set.

Referring now to FIG. 5, a flowchart illustrating a method 500 for generating a text message is shown. The method 500 includes initiating a text-messaging application on a communications device at 505. Such applications, as was discussed above, include instant messaging applications, short-message-system applications, short mail applications or email applications.

After the text-messaging session is initiated, a real-time data session is established between the communications device and a service node at 510. As was previously discussed, various protocols and data session initiation techniques are possible for establishing such a real time data session. For example, the data session may be an RTP session initiated by SIP. This data session may then be used to communicate information between the communications device and the service node for text messaging or other purposes.

A first user-entry may then be received using the communications device at 515. For this embodiment, the first user-entry is one or more text characters corresponding with a desired text string. As was previously described, these text characters may be input into the communications device using a variety of methods, such as typing, the triple-tapping text entry technique or the T9 text entry technique. Alternatively, the text characters may be spoken, as was described above.

The first user-entry may also have a corresponding threshold number of characters that the user enters before any text prediction is commenced by the method 500. Such a threshold is typically established at a communications device, such as the mobile phone 210 in FIG. 2. However, a threshold may also be established at a service node, such as the service node 220 in FIG. 2. Such a threshold may depend on the particular mode selected for text entry (e.g. word, phrase, sentence). Alternatively, the threshold may be based on a first character typed by the user. For example, typing "+" may indicate that an acronym is to be entered and the threshold may be set to three additional characters. In this situation, the user may enter "+gtg" and the transient grammar may include the phrase "got to go." Additional short hand and acronyms used in text messaging that may be predicted by the system 200 are shown in the table below.

| Messaging Acronym/Short hand | Grammar Store |
|---|---|
| Lol | Laughing out loud |
| L8r | Later |
| :-O | Wow |
| :) | Smiley face |
| :( | Sad |
| :-() | Shocked |

After the text characters are entered, they are then communicated from the communications device to the service node, at 520, using the real-time data session. The service node then creates a transient grammar set from a grammar store, based on the text characters at 525. The transient grammar set may be created using the techniques that have been previously described, such as using a predictive engine including an ANN.

After creating the transient grammar set, the service node then communicates with the communications device, at 530, to indicate that the transient grammar set has been created. As has been previously discussed, such an indication may include playing a TTS speech prompt or displaying a list of text strings corresponding with the transient grammar set.

At 535, a second user-entry is received at the communications device. This second user-entry may be a spoken selection or a menu selection corresponding with a portion of the transient grammar set. As has been previously described, a spoken user-entry may be processed using a speech recognition engine, which may be client/server based, client based or server based, depending on the particular embodiment.

For the method shown in FIG. 5, the second user-entry is transmitted to the service node at 540 and compared with transient grammar set at 545. For a spoken entry, the entry is compared to phonemes corresponding with the transient grammar set to determine a desired text string corresponding with the entry. This comparison is accomplished using a speech recognition engine, such as has been previously described.

At 550, the desired text string is transmitted from the service node to the communications device using the real-time data session. After receipt by the communications device, the desired text string is displayed in the text messaging application initiated at 505.

Exemplary arrangements of the present invention have been described. Those skilled in the art will understand, however, that changes and modifications may be made to these arrangements without departing from the true scope and spirit of the present invention, which is defined by the claims.

We claim:

1. A method of text entry comprising:
   receiving a first user-entry with a communications device;
   creating a transient grammar set as a result of receiving the first user-entry, the transient grammar set being based on the first user-entry, wherein creating the transient grammar set comprises selecting from a grammar store a subset of grammars that correspond to the first user-entry;
   providing an indication that the transient grammar set is created, the indication being provided using the communications device;
   receiving a second user-entry with the communications device;
   responsively selecting a text string from the transient grammar set, the text string corresponding with the second user-entry; and
   discarding the transient grammar set after the text string corresponding with the second user-entry has been selected.

2. The method of claim 1, wherein receiving the first user-entry comprises receiving one or more user-typed characters entered on the communications device.

3. The method of claim 2, further comprising transmitting the one or more user-typed characters from the communications device to a service node over a communications link.

4. The method of claim 3, wherein the communications link is a wireless communications link.

5. The method of claim 3, wherein transmitting the one or more user-typed characters comprises transmitting the one or more user-typed characters as a result of a threshold number of characters being entered on the communications device.

6. The method of claim 5, further comprising determining the threshold number of characters based on a first character of the user-typed characters.

7. The method of claim 5, wherein the threshold number of characters is determined by the communications device.

8. The method of claim 1, wherein selecting the subset of grammars comprises implementing a weighted statistical model using an artificial neural network software application.

9. The method of claim 1, wherein the step of providing an indication that the transient grammar set is created comprises generating an audio prompt using the communications device.

10. The method of claim 9, wherein the audio prompt is a text-to-speech prompt.

11. The method of claim 1, wherein providing an indication that the transient grammar set is created comprises displaying a list of text strings using the communications device, the list of text strings corresponding with the transient grammar set.

12. The method of claim 1, wherein receiving the second user-entry comprises receiving a spoken user-entry with the communications device.

13. The method of claim 12, wherein responsively selecting a text string that corresponds with the second user-entry comprises:
transmitting the spoken user-entry to a service node;
comparing the spoken user-entry with phonemes of the transient grammar set on the service node; and
matching the spoken user-entry with a text string that corresponds with a set of phonemes of the transient grammar set.

14. The method of claim 13, further comprising digitally sampling the spoken user-entry prior to transmitting the spoken user-entry to the service node.

15. The method of claim 12, wherein responsively selecting a text string that corresponds with the second user-entry comprises:
comparing the spoken user-entry with phonemes of the transient grammar set using the communications device; and
matching the spoken user-entry with a text string that corresponds with a set of phonemes of the transient grammar set.

16. The method of claim 1, wherein receiving the second user-entry comprises receiving a menu selection with the communications device.

17. The method of claim 16, wherein receiving a menu selection comprises receiving a signal generated by depressing a key on the communications device.

18. The method of claim 16, wherein receiving a menu selection comprises receiving a signal generated by mechanical contact with a touch-screen display of the communications device.

19. A text-messaging system comprising:
a communications device;
a communications service node communicatively coupled with the communications device, wherein at least one of the communications device and the service node, alone or in combination, implement a speech recognition engine;
a processor coupled with at least one of the communication device and the service node; and
a predictive engine executable by the processor for generating a transient grammar set based on a subset of grammars selected from a grammar store, the subset of grammars corresponding to a first user-entry made using the communications device;
wherein the speech recognition engine selects a text string associated with a portion of the transient grammar set based on a second user-entry made using the communications device, the second user-entry being a selection from the transient grammar set; and
wherein the transient grammar set is discarded after the text string associated with the portion of the transient grammar set has been selected.

20. The text-messaging system of claim 19, wherein the communications device comprises one of: a wireless telephone; a personal data assistant; a laptop computer; an Internet appliance, a desktop personal computer, and a wired telephone.

21. The text-messaging system of claim 19, wherein the communications device and the service node implement a distributed speech recognition engine.

22. The text-messaging system of claim 19, further comprising an electronic database coupled with the processor, the database including the grammar store.

23. The text-messaging system of claim 22, wherein the grammar store comprises grammars based on English language rules; and
text messages communicated using the text-messaging system.

24. The text-messaging system of claim 22, wherein grammars associated with text messages communicated by a particular user are also associated with the particular user in the database.

25. The text-messaging system of claim 19, wherein the predictive engine comprises an artificial neural network.

26. The text messaging system of claim 25, wherein the artificial neural network comprises a weighted statistical model for predicting a desired text string based on the first user-entry.

27. The text-messaging system of claim 19, wherein, based on a mode selection on the communications device, the text string comprises one of a word, a phrase and a sentence.

28. The text-messaging system of claim 19, wherein the first entry is a typed text entry and the second entry is at least one of a spoken entry and a menu selection entry.

29. The text-messaging system of claim 19, further comprising a session manager for managing a text-messaging session, wherein the session manager synchronizes changing a communications link coupling the communications device and the service node between a voice channel and a data channel.

30. The text-messaging system of claim 29, wherein the session manager comprises logic to:
track communication protocol parameters for the data session and the voice session; and
responsively switch between the data session and the voice session based on an information type being received from the communications device.

31. A method for generating a text message comprising:
initiating a text-messaging application on a communications device;
establishing a real-time data session between the communications device and a service node;
receiving a first user-entry at the communications device, the first user-entry comprising one or more text characters corresponding with a desired text string;
transmitting the text characters from the communications device to the service node using the real-time data session;
generating a transient grammar set based on a subset of grammars selected from a grammar store at the service node, the subset of grammars corresponding to the first user-entry;
indicating that the transient grammar set is created using the communications device as a result of receiving a signal from the service node;
receiving a second user-entry at the communications device, the second user-entry corresponding with the desired text string and being a selection from a set of text strings corresponding with the transient grammar set;

transmitting the second user-entry from the communications device to the service node;

comparing the second user-entry with the transient grammar set to identify the desired text string, the comparison being done using the service node;

transmitting the desired text string from the service node to the communications device;

displaying the desired text string on the communications device in the text-messaging application; and discarding the transient grammar set after the desired text string is identified.

32. The method of claim 31, wherein the text-messaging application comprises at least one of an instant messaging application, a short-message-system application, a short-mail application, and an email application.

33. The method of claim 31, wherein establishing a real time data session comprises establishing a real time protocol (RTP) session.

34. The method of claim 33, wherein the RTP session is established using session initiation protocol (SIP).

35. The method of claim 31, wherein receiving one or more text characters comprises receiving a predetermined number of user-entered text characters on the communications device, the user-entered text characters being entered using one or more keys included in the communications device.

36. The method of claim 31, wherein generating the transient grammar set comprises predicting, based on the predetermined number of text characters, the desired text string.

37. The method of claim 36, wherein predicting the desired text string is accomplished using an artificial neural network.

38. The method of claim 31, wherein indicating that the transient grammar set is created comprises playing a text-to-speech prompt on the communications device.

39. The method of claim 31, wherein indicating that the transient grammar set is created comprises displaying the set of text strings corresponding with the transient grammar set on the communications device.

40. The method of claim 31, wherein receiving the second user-entry at the service node comprises receiving digitized speech corresponding with a spoken user-entry from the communications device.

41. The method of claim 40, wherein the digitized speech comprises voice-over-packet data.

42. The method of claim 40, further comprising using the speech recognition engine to compare the digitized speech with phonemes included in the transient grammar set to determine the desired text string.

* * * * *